United States Patent Office 3,205,063
Patented Sept. 7, 1965

3,205,063
METHOD AND COMPOSITION FOR MAKING CARBONATE-BONDED AGGLOMERATES
Richard L. Franklin, Glassport, James R. Guseman, Hempfield Township, Westmoreland County, and Eugene A. Pelczarski, West Deer Township, Allegheny County, Pa., assignors to United States Steel Corporation, a corporation of New Jersey
No Drawing. Filed Nov. 8, 1962, Ser. No. 236,405
3 Claims. (Cl. 75—3)

This invention relates to an improved method and composition for making carbonate-bonded agglomerates of iron ore or the like.

Conventionally carbonate-bonded ore agglomerates are made by mixing ore fines with an alkaline-earth metal oxide or hydroxide and a small amount of water, forming the mixture into green agglomerates (pellets or briquettes) of the desired size and shape, and treating the green agglomerates with $CO_2$. Thus the alkaline-earth metal compound is converted at least partially into a carbonate which bonds the ore particles. The resulting final agglomerates have sufficient mechanical strength for use in metallurgical processes. One disadvantage to this method as practiced heretofore is that the moisture content of the green agglomerates must be controlled rather closely. A moisture content of about 2 to 8 percent is usually considered optimum, while 10 percent moisture has been about the maximum which can be tolerated and still produce satisfactory final agglomerates. Many ores have a moisture content higher than 10 percent, particularly if they are prepared for pelletizing in a disc or drum. Consequently it is often necessary to predry the green agglomerates before the $CO_2$ treatment. The predrying operation is costly and requires elaborate controls to assure uniformity.

An object of our invention is to provide an improved method of making carbonate-bonded ore agglomerates in which we obtain satisfactory final agglomerates when the moisture content of the green agglomerates is in a broader range.

A further object is to provide improved compositions for forming carbonate-bonded ore agglomerates, which compositions contain an additive for broadening the range of permissible moisture content.

A more specific object is to provide an improved method and composition for making carbonate-bonded ore agglomerates in which we introduce a small quantity of sodium tetraborate to increase the solubility of $CO_2$ in the green agglomerates, thus enabling us to obtain satisfactory final agglomerates with moisture contents as high as about 15 percent in the green agglomerates.

In practicing our invention, we first mix ore fines and an alkaline-earth metal compound in the usual fashion. The ore fines can be hematite, magnetite, or other oxidic ores of iron or similar metals such as manganese. The alkaline-earth metal compound preferably is calcium or magnesium oxide or hydroxide or a mixture of the foregoing compounds. In accordance with our invention, we add sodium tetraborate or equivalent in an amount sufficient to produce a sodium content of about 0.12 to 0.60 percent by weight or preferably about 0.19 to 0.31 percent. Preferably the sodium tetraborate is in the form of borax ($Na_2B_4O_7 \cdot 10H_2O$). We form the mixture into green agglomerates of any convenient size, preferably by a conventional pelletizing or molding operation. We add moisture as needed for the agglomerating step up to a maximum water content of about 15 percent by weight, although preferably in the range of about 6 to 12 percent. The green agglomerates have a composition by weight on a wet basis about as follows:

Ore fines _____ 77 to 96%.
Alkaline-earth metal compound _____ 2 to 8%.
Water _____ 2 to 15%.
Sodium tetraborate _____ Sufficient to produce a sodium content of 0.12 to 0.60%.

Next we treat the green agglomerates with $CO_2$ in the conventional way. Preferably we perform this treatment for a minimum period of about 30 minutes with the agglomerates at room temperature and atmospheric pressure. The $CO_2$ can be wet or dry, depending on the moisture content of the agglomerates. We do not predry the green agglomerates, but expose them to $CO_2$ gas while they still contain the same quantity of moisture as when they were formed. The sodium tetraborate increases the solubility of $CO_2$ in the moist agglomerates, and thus enables the carbonating reactions to take place and produce a satisfactory final agglomerate despite higher moisture contents.

The following specific examples demonstrate the benefits we attain with our invention.

Example 1

We mixed minus 8-mesh hematitic ore fines with 5 percent powdered lime (CaO) and varying percentages of borax and pelletized the mixture in a conventional pelletizing disc. The resulting green pellets were approximately $\frac{3}{8}$ to $\frac{1}{2}$ inch in diameter and contained between 12 and 13 percent water on a wet basis. We dumped the green pellets into a vessel and treated them with water-saturated $CO_2$ at atmospheric pressure and room temperature. We tumbled the resulting carbonate-bonded pellets in a conventional coke tumbler for 50 revolutions and then screened the pellets on a U.S. Standard 30-mesh screen. The results were as follows:

| Percent Na (In the form of $Na_2B_4O_7 \cdot 10H_2O$) | Percent of material Retained on 30-Mesh Screen after Tumbling |
|---|---|
| 0.08 | 56 |
| 0.11 | 64 |
| 0.28 | 80 |
| 0.32 | 82 |
| 0.39 | 87 |
| 0.60 | 87 |

We consider that at least 75 percent of the material should be retained on a 30-mesh screen for the product to be acceptable. These results show we obtained acceptable final agglomerates with green agglomerates containing 12 to 13 percent water, which is substantially above 10 percent, previously believed to be a maximum. These results also indicate there is a sharp break in the screen residue between 0.11 and 0.28 percent sodium for this particular ore and moisture content.

Example 2

We prepared similar carbonate-bonded pellets of the same ore, but replacing the borax with a metallic or nonmetallic chloride, as known in the art. We subjected the final pellets to the same tumbler test as in Example 1. The results were as follows:

| Additive | Ore Size | Percent Moisture Range | Percent of Material Retained on 30-Mesh Screen after Tumbling |
|---|---|---|---|
| $CaCl_2$ | 200-mesh | 10–12 | 63 |
| $CaCl_2$ | do | 12–13 | 47 |
| $NH_4Cl$ | do | 10–12 | 67 |
| $NH_4Cl$ | do | 12–13 | 53 |
| $NH_4Cl$ | 8-mesh | 11–12 | 34 |
| $NH_4Cl$ | do | 14 | 45 |

These results indicate agglomerates produced with known additives and a moisture content above 10 percent (the upper limit recognized in the prior art) are unsatisfactory.

Example 3

We mixed minus 8-mesh hematitic ore fines with 5 percent lime and about 2 percent borax (0.24% Na). We pelletized the mixture, using varying moisture contents, and carbonated the green pellets with water-saturated $CO_2$ at atmospheric pressure and room temperature. We subjected the final pellets to the same tumbler test as in Example 1. The results were as follows:

| Percent Moisture Range | Percent of Material Retained on 30-Mesh Screen after Tumbling |
|---|---|
| 4–5 | 43 |
| 5–6 | 75 |
| 6–7 | 84 |
| 7–8 | 91 |
| 8–9 | 93 |
| 10–12 | 85 |
| 12–13 | 80 |
| 13–15 | 81 |
| 15–17 | 54 |

These results indicate there are sharp breaks in the percentage of plus 30-mesh material at about 5 percent water at one extreme and about 15 percent water at the other extreme. Although we obtained our strongest agglomerates with a water content of about 7 to 9 percent, the agglomerates we produced with a water content of 10 to 15 percent are well within acceptable limits.

Example 4

To illustrate the increased mass-transfer rate when borax is used and the agglomerates are carbonated at high moisture levels, we carbonated green pellets of hematitic ore containing 5 percent quicklime, 12 to 13 percent water and various additives. In each instance we carbonated the pellets with water-saturated $CO_2$, and subjected the final pellets to the same tumbler test as in Example 1. The results were as follows:

| Additive | Ore Size | Percent Conversion of CaO to $CaCO_3$ | Percent of Material Retained on 30-Mesh Screen after Tumbling |
|---|---|---|---|
| Borax | 8-mesh | 81 | 80 |
| Do | do | 85 | 82 |
| Do | do | 83 | 87 |
| $CaCl_2$ | 200-mesh | 19 | 47 |
| $NH_4Cl$ | do | 19 | 53 |
| $NH_4Cl$ | 8-mesh | 15 | 46 |

These results show that at high moisture levels the conversion of CaO to $CaCO_3$ is greatest with the addition of borax. Since the carbonating conditions were similar in each instance, it is apparent the mass-transfer rate of $CO_2$ is considerably increased by using borax. It is also apparent that the tumbler strength is a function of the degree of carbonation; that is, as conversion of CaO to $CaCO_3$ increases, so does the tumbler strength.

From the foregoing description and examples it is seen that our invention affords a simple and effective method of expanding the range of permissible water content and still making satisfactory carbonate-bonded ore pellets. Since our invention is based upon increasing the mass-transfer rate of $CO_2$, either through an increase in solubility of $CO_2$ in water or through an increase in the carbonate-ion concentration in the liquid phase, we can substitute for borax other additives which possess this property. One example of such an additive is ammonium borate ($NH_4HB_4O_7 \cdot 3H_2O$). It is apparent that the agglomerates can be made much more easily and at less cost when there is no need to control the moisture content as precisely.

While we have described and furnished examples of preferred embodiments of our invention, it is apparent other modifications may arise. Therefore we do not wish to be limited by the disclosure, but only by the scope of the appended claims.

We claim:

1. In a process for making carbonate-bonded ore agglomerates in which ore fines are mixed with water and a material selected from the group which consists of calcium oxide, calcium hydroxide, magnesium oxide, magnesium hydroxide, and combinations thereof, the resulting mixture is formed into green agglomerates, and the green agglomerates are treated with $CO_2$ to convert said material into a carbonate, the step which comprises introducing to the mixture a substance selected from the group which consists of sodium tetraborate and ammonium borate, whereby an increase is effected both in the solubility of $CO_2$ in the water and in the maximum water content which can be tolerated in the green agglomerates.

2. In a process for making carbonate-bonded ore agglomerates in which ore fines are mixed with water and a material selected from the group which consists of calcium oxide, calcium hydroxide, magnesium oxide, magnesium hydroxide and combinations therof, the resulting mixture is formed into green agglomerates, and the green agglomerates are treated with $CO_2$ to convert said material into a carbonate, the step which comprises introducing to the mixture sodium tetraborate in an amount sufficient to produce a sodium content of about 0.12 to 0.60 percent by weight on a wet basis, whereby the maximum water content which can be tolerated in the green agglomerates is increased to about 15 percent by weight on a wet basis.

3. A mixture for forming carbonate-bonded ore agglomerates, said mixture having a composition by weight on a wet basis about as follows:

| | |
|---|---|
| Ore fines | 77 to 96%. |
| A material selected from the group which consists of calcium oxide, calcium hydroxide, magnesium oxide, magnesium hydroxide, and combinations thereof | 2 to 8%. |
| Water | 2 to 15%. |
| Sodium tetraborate | Sufficient to produce a sodium content of 0.12 to 0.60%. |

References Cited by the Examiner

UNITED STATES PATENTS 958,700    5/10    Glass _____ 75—3

(Other references on following page)

UNITED STATES PATENTS

| | | | |
|---|---|---|---|
| 1,729,496 | 9/29 | Simpson | 75—3 |
| 2,844,457 | 7/58 | Amberg | 75—3 |
| 2,858,235 | 10/58 | Rex | 75—3 |

FOREIGN PATENTS

| 19,351 | 1902 | Great Britain. |
|---|---|---|

OTHER REFERENCES

Hackh's Chemical Dictionary, 3rd ed., 1944, The Blakiston Co., Philadelphia, Pennsylvania, pages 266, 871.

BENJAMIN HENKIN, *Primary Examiner.*

DAVID L. RECK, *Examiner.*